United States Patent Office 3,528,773
Patented Sept. 15, 1970

3,528,773
METHOD OF PREPARING TITANIUM DIOXIDE PIGMENT
Joseph P. Surls, Walnut Creek, and James E. Magner and Ben F. West, Antioch, Calif., assignors to The Dow Chemical Company, Midland, Mich., a corporation of Delaware
Filed Dec. 28, 1967, Ser. No. 694,787
Int. Cl. C01g 23/04
U.S. Cl. 23—202        14 Claims

ABSTRACT OF THE DISCLOSURE

A method for preparing pigment-grade $TiO_2$ which comprises forming a titanium dioxide product by contacting a $TiO_2$ seed solution having a low chloride/titanium gram-atom per liter ratio and a low multivalent anion concentration with a master solution having a high chloride/titanium gram-atom per liter ratio, at a temperature of from about 85°–150° C. for at least about 15 minutes to precipitate $TiO_2$ particles. These particles are then subjected to a retreatment process whereby they are contacted with an aqueous acidic retreatment solution at a temperature of about 175° to 300° C. for at least about 15 minutes to produce $TiO_2$ pigments which, without further treatment, usually have a tinting strength of at least about 1500.

BACKGROUND

Heretofore pigment-grade titanium dioxide was prepared by several different methods involving the hydrolysis of an aqueous acidic titanium chloride solution. However, to produce titanium dioxide pigments which had a tinting strength of at least 1500 the $TiO_2$ product from a hydrolyzation step had to be calcined at elevated temperatures, usually at least about 700° C., or the hydrolysis step had to be carried out at a temperature of at least about 175° C. for a prolonged reaction time usually greater than 3 hours. Both of these techniques have disadvantages. In the first, a separate high temperature calcination step, in addition to the hydrolysis operation, is required necessitating high temperature reaction equipment and increased production times. The second method causes serious disadvantages in that at the necessary high operating temperatures and high chloride content of the reaction solutions, high pressures, and serious corrosive problems are encountered.

It has now been discovered that $TiO_2$ pigments having a tinting strength of at least about 1500 can be prepared while employing lower hydrolysis temperatures, lower acid concentrations and without the necessity of employing a separate calcination step.

SUMMARY

In the present process a colloidal suspension of titanium dioxide in an aqueous medium, i.e., "seed solution" prepared from a solution having a low chloride/titanium ratio and a low multivalent anion concentration is usually admixed with an aqueous solution, i.e. "master solution" having a high chloride/titanium ratio and a low multivalent anion concentration and the admixture heated at a temperature of from about 85–150° C. for a sufficient period of time to precipitate a $TiO_2$ product. The $TiO_2$ product is then contacted with an aqueous acidic retreatment solution at a temperature of from about 175° to 300° C. for a sufficient period of time to produce pigmentary rutile $TiO_2$ having a tinting strength of at least about 1500.

DRAWINGS

Figure 1:
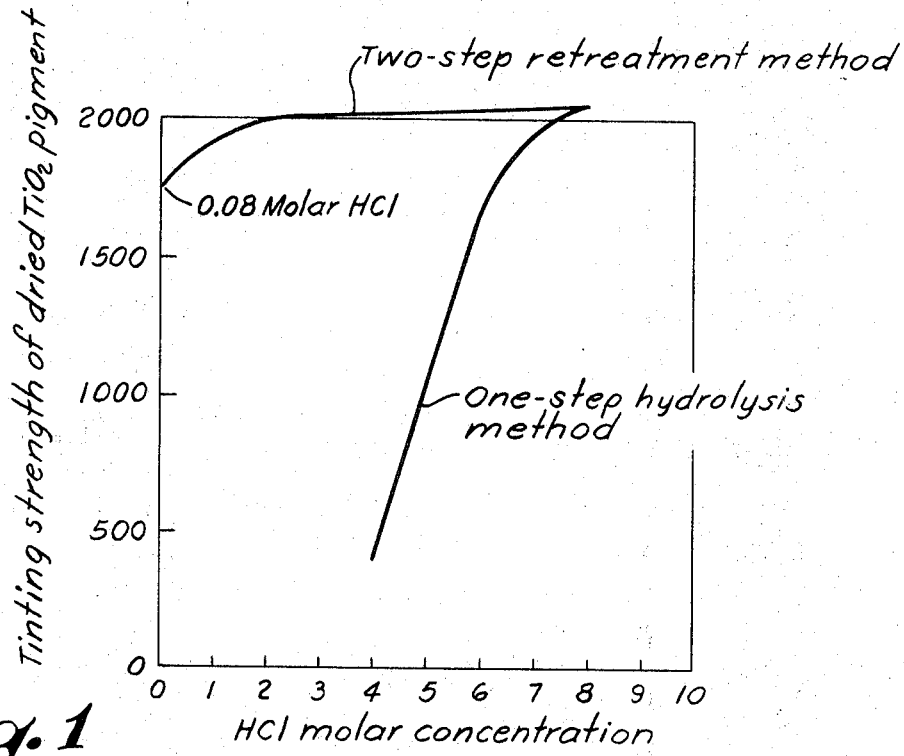
Figure 2:
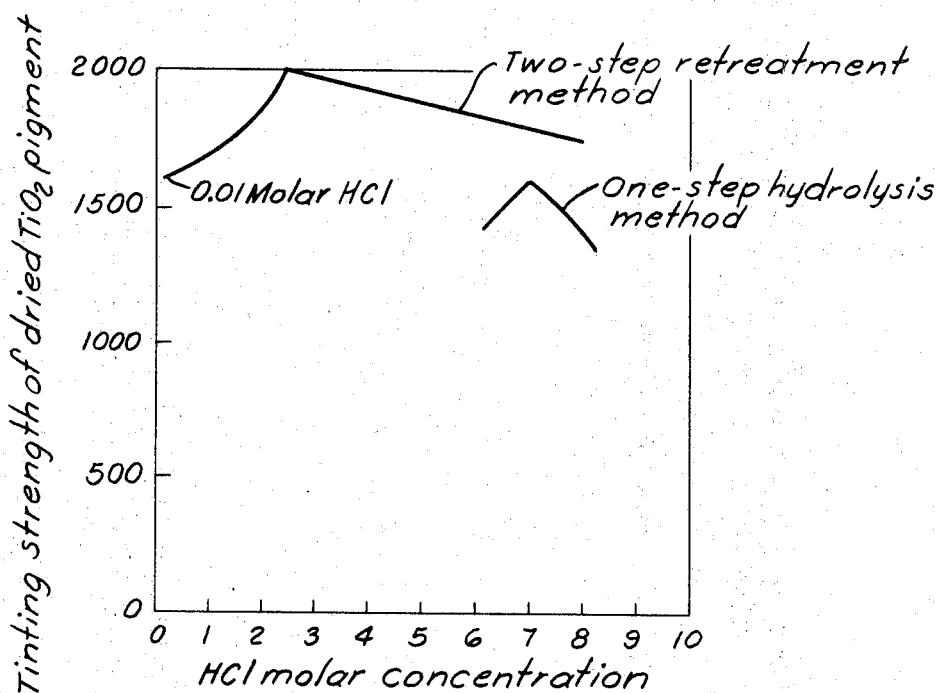

FIGS. 1 and 2 represent graphic comparisons of the tinting strengths of $TiO_2$ pigments produced by a one-step high temperature hydrolysis method, and $TiO_2$ prepared by the two-step retreatment method as defined herein, in relation to the acid concentration of the solution employed in the one-step method and of the retreatment solution.

PREFERRED EMBODIMENTS

In actual practice an initial hydrolysis mixture is prepared by mixing a quantity of "seed solution" sufficient to supply from about 4 to 10 percent by weight preferably from 5 to 7 percent by weight of the titanium values in the final admixture, with a master solution containing from about 20 to 80 grams per liter, preferably 30 to 40 grams per liter, of titanium, from about 6 to 11 gram-ions per liter, preferably from about 7 to 8 gram-ions per liter, of chloride ions and less than about 1 gram-ion per liter, preferably less than 0.1 gram-ion per liter, of multivalent anions. The resulting mixture is heated at a temperature of about 85° to 150° C., preferably 115° to 150° C. for at least 15 minutes, preferably from about 30 to 120 minutes, to precipitate a $TiO_2$ product.

The $TiO_2$ product is usually separated from the reaction solution and then contacted with an aqueous acidic retreatment solution containing from about 0.01 to about 20 gram-moles per liter of an acid selected from the group consisting of hydrochloric acid, perchloric acid, nitric acid and mixtures thereof, less than 1 gram-ion per liter, preferably less than 0.1 gram-ion per liter, of multivalent anions and less than 1 gram-ion per liter of cations having a valence greater than 2. Preferably the solution contains from 1 to about 4 gram-moles per liter of an acid and preferably not more than 5.5 gram-moles per liter of HCl and/or not more than 12 gram-moles per liter of perchloric acid should be present. The product $TiO_2$ from the hydrolysis step is contacted with said solution and maintained at a temperature of from about 175° to 300° C., preferably 225° C. to 250° C., for at least 15 minutes, preferably from about 30 to 120 minutes, to produce pigmentary rutile $TiO_2$ usually having a tinting strength of at least about 1500. Although, as indicated, hydrochloric acid may be employed in the retreatment solution it is usually preferred to employ nitric or perchloric acids which are less corrosive with the materials of construction of the reactors usually employed. Furthermore, lower working pressures are required because of the lower vapor pressure of the nitric and perchloric acid as compared with hydrochloric acid at the operating temperatures employed.

The seed solution employed herein can be prepared by a number of well known methods. For example, a seed solution comprising a bluish-colored opalescent colloidal suspension of titanium dioxide particles having a diameter of from about 0.002 to about 0.010 micron, can be prepared by the method as taught by Long et al. in U.S. Pat. No. 3,329,484, issued July 4, 1967. There a seed solution is prepared from an aqueous titanium chloride solution having a chloride/titanium gram-atom ratio of from about 1.5 to about 4, preferably from about 1.6 to about 2.3, a pH of from about 0.3 to about 0.7 and a titanium concentration of from about 8 to about 30 grams per liter, preferably from about 8 to about 15 grams per liter. (The term "titanium" as used means titanium in an oxidized state.) The solution is heated at a temperature of from about 60 to about 90° C. for about 4 to 60 minutes, preferably at a temperature of about 75 to 85° C. for about 15 to 30 minutes whereupon a bluish-colored opalescent suspension of titanium dioxide particles is precipitated. Titanium dioxide seed solutions prepared by other conventional methods may be employed in the method of the present invention. It is preferred that the seed solution be substantially free of iron.

The initial solutions used for preparing the seed and titanium chloride master solutions can be made from a variety of source materials. For example, $TiCl_4$, obtained from the direct chlorination of titanium containing materials, can be introduced into water to provide a solution containing the appropriate concentration and the pH adjusted by the addition of a base such as, for example, KOH, NaOH or ammonia. Another source material consists of the substantially iron free $TiCl_4$ leach liquor solution resulting from the dissolution of a titaniferrous material with hydrochloric acid with a subsequent solvent extraction for iron removal as set forth in U.S. Pat. No. 3,104,950, issued Sept. 24, 1963 to Ellis. The acidic titanium chloride solution obtained by this process provides an excellent high purity titanium chloride master solution as well as a source solution for seed preparation. By heating the solution under reduced pressure to remove excess of HCl the appropriate chloride/titanium ratio for seed preparation can be provided. The so-concentrated solution is then diluted to the proper Ti concentration range with or without additional neutralization.

As indicated, the $TiO_2$ product from the hydrolization step is usually separated from the reaction solution by any convenient means such as, for example, by evaporation or filtration. Conveniently, a dry $TiO_2$ product is prepared by evaporating off the liquid phase completely. The separated $TiO_2$ product (wet or dry) is then contacted with the aqueous acidic retreatment solution. The $TiO_2$ product and retreatment solution may be continuously agitated so as to provide a slurry system. If this procedure is employed the solution usually contains not more than 50 percent by weight, preferably from 5 to 25 percent by weight, of the $TiO_2$ product. It is not, however, essential that the $TiO_2$ particles and retreatment solution be provided in a slurry form and it is only necessary that substantially all the $TiO_2$ particles are contacted with the retreatment solution for the operating times and at the temperatures previously indicated. Also it is not essential to completely separate the $TiO_2$ product from the reaction solution from the hydrolysis step, for the $TiO_2$ may be treated as a sludge by evaporating some but not all of the reaction solution.

The $TiO_2$ pigments produced by this method will usually have a tinting strength of greater than about 1500 and can be employed directly for use as a pigment in water based (latex) paints. For use in oil base paints, baked enamels and for the pigmenting of plastics the $TiO_2$ pigment can be coated, for example, with alumina and/or silica as is commonly practiced in the art.

If desired, the $TiO_2$ pigments produced by this process can be calcined at a temperature of about 700 to about 900° for about 0.5 to 6 hours, preferably from about 800° to about 850° C. for about one hour to further increase their tinting strength but as indicated calcination is not usually required.

The entire process can be carried out at autogenous or higher pressures. However, high pressures are not necessary and it is preferred to operate at autogenous pressures. It is possible to lower the operating pressure during the acidic retreatment step by employing in the acidic liquor retreatment solution ammonium salts and salts of metals having a valence not greater than two. The salts may be employed in amounts up to the saturation level of the salt in the acidic solution. The use of such salts reduces the vapor pressures at a given operating temperature significantly without deleteriously effecting the tinting strength of the $TiO_2$ pigment. Examples of suitabe salts include ammonium chloride, sodium nitrate, calcium chloride, sodium chloride, ammonium nitrate and other like salts having metal cations of a valence not greater than two. However, even without the addition of the salts, one advantage afforded by the present method is that lower operating acid concentrations and temperatures are required than heretofore possible thereby lowering the operating pressures created by the system.

Although substantially iron free solutions are preferred for preparing the present $TiO_2$ pigments, a satisfactory pigment can be prepared even though some iron is present in the reactant materials.

Tinting strengths as employed herein are determined using a modified Reynolds method of tinting strength comparison. In this method a given pigment is given a number which is the whitening power, i.e. the ability of the pigment to whiten a standard amount of blue color, relative to the standard pigment. In the conventional Reynolds test, the standard is Titanox B pigment with a tinting strength of 390. In present examples a Du Pont R510 pigment having a tinting strength of 1600 was employed as the standard.

The following examples will facilitate a more complete understanding of the present invention but it is understood that the invention is not limited thereto.

Example 1

Several $TiO_2$ pigment samples were prepared in the following manner. The first set of samples were prepared by a one-step hydrolysis method employing operating conditions set forth herein for the first step of the two-step method as disclosed herein but employing an operating temperature of about 250° C., a reaction time of about 2 hours and employing different concentrations of hydrochloric acid. The tinting strength for each sample was determined. A second set of $TiO_2$ samples were prepared employing the two-step method as described hereinbefore wherein the hydrolysis step was carried out at a temperature of about 150° C. and the $TiO_2$ product was then retreated at a temperature of 250° C. with a retreatment solution containing various concentrations of hydrochloric acid. The HCl concentrations and resulting tinting strengths for the two sets of samples are tabulated in following Table I, and a comparison of tinting strength versus acid concentration is graphically shown in FIG. 1.

TABLE I

| Sample No. | One step hydrolysis at 250° C. for 2 hours | | Two step method with hydrolysis at 150° C. and the retreatment step at 250° C. for 2 hours | |
|---|---|---|---|---|
| | HCl con., molar | Tinting strength | HCl conc. in retreatment solution, molar | Tinting strength |
| 1 | 4 | 400 | 0.08 | 1,750 |
| 2 | 6 | 1,650 | 2 | 2,000 |
| 3 | 7 | 1,950 | 8 | 2,050 |
| 4 | 8 | 2,050 | | |

It can be seen from this data that at a hydrolysis temperature of 250° C. tinting strengths above 2000 cannot be obtained in the one-step process unless the acid concentration (HCl) is at least about 7 molar whereas when employing the retreatment method the acid concentration in the retreatment solution need only be about 2 molar. For a tinting strength of about 1750 the high temperature one-step hydrolysis method requires the use of a 6 molar HCl concentration whereas in the two-step retreatment process an acid concentration (HCl) of only about 0.08 molar is required.

For a tinting strength of 1500 the one-step high temperature hydrolysis method still requires an acid concentration of about 5.5 molar.

Example 2

A series of $TiO_2$ samples were prepared by substantially identical operating conditions as employed in Example 1 except that the temperature employed in the one-step process and in the retreatment step was about 180° C. The tinting strengths and acid concentrations are tabulated in the following Table II and graphically illustrated in FIG. 2.

TABLE II

| Sample No. | One step hydrolysis at 180° C. for 2 hours | | Two step method with hydrolysis at 150° C. and the retreatment step at 180° C. for 2 hours | |
|---|---|---|---|---|
| | HCl con., molar | Tinting strength | HCl conc. in retreatment solution, molar | Tinting strength |
| 1 | 6.5 | 1,500 | ~0.01 | 1,600 |
| 2 | 7 | 1,600 | 2 | 1,850 |
| 3 | 7.5 | 1,500 | 2.5 | 2,000 |
| 4 | 8 | 1,400 | 8 | 1,750 |

When employing a temperature of only 180° C. in the one-step hydrolysis method, $TiO_2$ having tinting strengths above 1500 could only be achieved by employing an acid concentration (HCl) of between about 6.5 and 7.5 molar, and the maximum tinting strength that could be achieved at any concentration was less than 1700. In sharp contrast, $TiO_2$ having tinting strengths above 1500 were obtained in the retreatment process while employing an acid concentration in the retreatment solution of only about 0.01 molar and tinting strengths of about 1850 were obtained employing 2 molar HCl retreatment solutions.

Example 3

A $TiO_2$ product was made employing a seed solution containing 0.25 gram-atoms per liter of Ti, 0.5 gram-ions per liter of chloride and less than 1 gram ion per liter of multivalent ions, and a master solution containing 31 grams per liter of Ti and 9 gram-ions per liter of chloride. Twelve parts by volume of the seed solution was admixed with seventy-eight parts by volume of the master solution and the admixture was maintained at a temperature of about 150° C. for about 1 hour whereupon a $TiO_2$ product precipitated. The $TiO_2$ was separated from the reaction mixture by filtering. This $TiO_2$ product, after washing with water and drying had a tinting strength of about 700. Portions of the filtered $TiO_2$ product after displacement washing on a filter with 4 molar aqueous nitric acid solution, were treated with a 4 molar $HNO_3$ solution at different temperatures and for varying lengths of time. The tinting strength for each treated portion was determined. The treatment temperatures, time and resulting tinting strengths are tabulated in the following Table III.

TABLE III

| Run No. | Time (hours) | Temp., ° C. | Tinting strength |
|---|---|---|---|
| 1 | ½ | 180 | 850 |
| 2 | 1 | 180 | 1,000 |
| 3 | 2 | 180 | 1,450 |
| 4 | 4 | 180 | 1,550 |
| 5 | ½ | 225 | 1,750 |
| 6 | 1 | 225 | 1,750 |
| 7 | 2 | 225 | 1,750 |
| 8 | 4 | 225 | 1,800 |
| 9 | ½ | 240 | 1,850 |
| 10 | 1 | 240 | 1,850 |
| 11 | 2 | 240 | 1,850 |
| 12 | 4 | 240 | 1,850 |
| 13 | ½ | 250 | 1,700 |
| 14 | 1 | 250 | 1,950 |
| 15 | 2 | 250 | 2,000 |
| 16 | 4 | 250 | 1,950 |

The effect of temperature during the retreatment process on the tinting strength of the $TiO_2$ pigments is illustrated by this example. The tinting strength tends to level off, even with increased reaction times, at a temperature of about 240°–250° C. At the minimum temperature of about 180° C. nearly 4 hours treatment time was required to obtain a product having a tinting strength of about 1500.

Example 4

To demonstrate the effect of acid strength on the tinting strength of treated $TiO_2$ pigments several portions of the same $TiO_2$ product made in Example 3 were treated at a constant temperature of from about 230° C. to 235° C. for about 2 hours, with an aqueous retreatment solution containing different concentrations of nitric acid. The tinting strength for each sample was determined and the process conditions tabulated in the following Table IV.

TABLE IV

| Run No. | $HNO_3$ conc., moles | Temperature (° C.) | Time (hrs.) | Tinting strength |
|---|---|---|---|---|
| 1 | 0.5 | 230–235 | 2 | 1,650 |
| 2 | 1.0 | 230–235 | 2 | 1,900 |
| 3 | 4.0 | 230–235 | 2 | 1,950 |
| 4 | 10.0 | 230–235 | 2 | 1,900 |

As shown the tinting strength was significantly increased when the $HNO_3$ concentration was increased from 0.5 M to 1.0 M but on significant increase in tinting strength resulted in going from 1.0 M to 4.0 M or to 10 M $HNO_3$.

Example 5

A $TiO_2$ product was prepared as in Example 3 except that the seed solution and master solution were treated for about 2 hours at a temperature of 150° C. The $TiO_2$ product from this hydrolization process had a tinting strength of about 1050. Portions of the $TiO_2$ product were treated at a temperature of 250° C. for about 2 hours in different retreatment media. From about 10–20 percent by weight of the retreatment medium consisted of the $TiO_2$ in each retreatment process. The tinting strengths of the treated $TiO_2$ product portions and process variables are tabulated in the following Table V.

TABLE V

| Run. No. | Aqueous media | Conc. of media | Tinting strength |
|---|---|---|---|
| 1 | HCl | 0.08 M HCl | 1,750 |
| 2 | HCl | 2.0 M HCl | 2,100 |
| 3 | HCl | 8.0 M HCl | 2,150 |
| 4 | NaOH | pH=5 | 1,350 |
| 5 | NaOH | pH=7 | 1,200 |
| 6 | NaCl | 1.8 M pH 1.5 [1] | 1,950 |
| 7 | NaCl | 1.8 M pH 5 [1] | 1,550 |
| 8 | NaCl | 1.8 M pH 7 [1] | 1,150 |
| 9 | $CaCl_2$ | 4 M pH 0.5 [1] | 1,900 |
| 10 | $AlCl_3$ | 2 M pH 0.5 [1] | 1,400 |
| 11 | $HNO_3$ | 4 M | 2,000 |
| 12 | $NaNO_3$ | 2 M pH 1.5 [1] | 1,850 |
| 13 | $NaNO_3$ | 2 M pH 5 [1] | 1,350 |
| 14 | $NaNO_3$ | 2 M pH 7 [1] | 1,200 |
| 15 | $Al(NO_3)_3$ | 2 M | 1,200 |
| 16 | $H_2SO_4$ | 1 M | 1,450 |
| 17 | $NaHSO_4$ | 4 M | 1,250 |
| 18 | $NH_4OH$ | 0.3 M | 1,450 |
| 19 | $NH_4OH$ | 1.5 M | 1,450 |
| 20 | $HClO_4$ | 2 M | 1,950 |

[1] pH was adjusted by adding of $NH_4OH$ or HCl.

Runs 1, 2, 3 again demonstrate the effect of acid concentration on the tinting strength of the treated $TiO_2$ pigment. A significant increase is shown when going from 0.08 M HCl to 2.0 M but no significant increase in tinting strength resulted when going from 2.0 to 8.0 M HCl.

Runs 6 through 9 show the non-interference of the presence of salts having cations with a valence of 2 or less and also the effect of the pH on the tinting strength. As shown, these cations are not detrimental to the preparation of $TiO_2$ pigments having tinting strengths greater than 1500. However, as demonstrated, neutral or basic retreatment solutions do not produce $TiO_2$ pigments which have as good tinting strengths as do the acidic retreatment solutions.

Runs 10 and 15 show the detrimental effect on the tinting strength of the presence of greater than 1 gram-ion per liter of cations having a valence greater than 2.

Runs 16 and 17 show the detrimental effect of the presence of multivalent anions on the tinting strength of the treated $TiO_2$ pigment. In this method the $HSO_4^-$ anion has similar harmful effects as does other multivalent anions such as, for example, the $SO_4^=$ anions.

Run 20 illustrates the use of perchloric acid in the retreatment solution.

To illustrate the necessity of employing the conditions as set forth hereinbefore, $TiO_2$ pigments were prepared in Examples 6 through 10 using a retreatment step but employing low temperatures and no seed solutions in the initial hydrolysis step. The resulting tinting strengths of the prepared $TiO_2$ were considerably lower than when the conditions as set forth herein were employed as illustrated in the previous examples.

Example 6

A $TiO_2$ pigment was prepared by first admixing 190 parts $TiCl_4$ with 1000 parts by weight of water and 160 parts by weight of NaOH. This solution was stirred and cooled so that the temperature of the solution did not rise above about 5° C. $TiO_2$ precipitated. To 100 parts by weight of the suspension of titanium dioxide particles was added 6.4 parts by weight of 50 percent nitric acid and the admixture was heated at a temperature of about 300° C. and under a pressure of about 200 p.s.i. for 2 hours. The final $TiO_2$ pigment had a tinting strength of only about 950.

A second 100 parts by weight suspension was admixed with about 8.5 parts by weight of 20 percent hydrochloric acid and treated at the same temperature, pressure and time as with the first batch. The resulting $TiO_2$ pigment had a tinting strength of only about 1050.

Example 7

190 parts by weight of titanium tetrachloride are introduced into 1000 parts by weight of an aqueous solution containing 160 parts by weight of sodium hydroxide and 130 parts by weight of sodium chloride while stirring and cooling in such a manner that the temperature of the solution during the precipitation does not essentially exceed 5° C. The suspension of finely divided titanium dioxide was acidified with 85 parts by weight of 20% hydrochloric acid and then heated to about 300° C. under a pressure of 200 atmospheres and maintained at this temperature and this pressure for 2 hours. The suspension was cooled and the titanium dioxide formed was converted into the finished pigment by filtering, washing and drying. The finished pigment had a tinting strength of about 1150.

Example 8

Another batch of $TiO_2$ pigment was prepared as in Example 7 except that the initial hydrolysis step was done at a temperature of from about 75–85° C. The finally produced $TiO_2$ pigment had a tinting strength of about 1250.

Example 9

190 parts by weight of titanium tetrachloride were introduced at 40–50° C. into 1000 parts by weight of water while stirring and cooling. The clear solution obtained was evaporated and titanium dioxide was precipitated. The evaporation was continued until the sludge formed still contained about 15 parts by weight of hydrochloric acid. The sludge was suspended in 500 parts by weight of water containing about 16 parts by weight of sodium hydroxide. The solution was heated at a temperature of about 300° C. and under an elevated pressure of about 200 p.s.i. for about 1 hour. The reaction mixture was cooled and the $TiO_2$ precipitate was separated from the solution, washed and dried. The pigment had a tinting strength of about 1450.

Example 10

A $TiO_2$ pigment was prepared as in Example 9 except that the temperature during the hydrolysis step was maintained only at about 0–5° C. The finally prepared $TiO_2$ pigment had a tinting strength of only about 500.

Various modifications may be made in the present invention without departing from the scope or spirit thereof for it is understood that we are limited only as defined in the appended claims.

We claim:

1. A process for preparing pigmentary rutile titanium dioxide which comprises:

(a) heating an initial hydrolysis mixture of a colloidal suspension of titanium dioxide nucleating seed particles with a titanium chloride solution having a titanium concentration of from about 20 to 80 grams per liter, a chloride concentration of from about 6 to about 11 gram-ions per liter and less than 1 gram-ion per liter of multivalent anions at a temperature of from about 85° to about 150° C. for from about 15 minutes to about two hours to preicptate titanium dioxide particles, and (b) contacting said titanium dioxide particles with one of an aqueous solution containing from about 0.01 to about 5.5 gram-moles per liter of HCl, an aqueous solution containing from 0.01 to about 20 gram moles per liter of $HClO_4$, an aqueous solution containing from 0.01 to about 20 gram moles per liter of $HNO_3$ or an aqueous solution containing a mixture of at least 2 of said acids, said total concentration of acids in said aqueous solution ranging from about 0.01 to about 20 gram-moles per liter and from 0.01 to about 5.5 gram-moles per liter of HCl, said acidic solution further characterized as containing less than 1 gram-ion per liter of multivalent anions and less than 1 gram-ion per liter of cations having a valence greater than 2 and heating said admixture to a temperature of from about 175° to 300° C. for at least 15 minutes to enhance the tinting strength of said titanium dioxide particles and produce pigmentary rutile $TiO_2$, having a tinting strength of at least about 1500.

2. The process as defined in claim 1 wherein the titanium chloride solution contains about 30 to 40 grams of titanium per liter, about 7 to 8 gram-ions per liter of chloride and less than 0.1 gram-ion per liter of multivalent anions.

3. The process as defined in claim 1 wherein said admixture of colloidal seed suspension and titanium chloride solution is heated to a temperature of from about 115° to 150° C. for about 30 to 120 minutes to precipitate $TiO_2$ particles.

4. The process as defined in claim 1 wherein the aqueous acidic solution contains from 1 to 4 gram-atoms per liter of said acids and mixtures thereof.

5. The process as defined in claim 1 wherein the aqueous acidic solution contains from 1 to 4 gram-moles per liter of nitric or perchloric acid or mixtures thereof.

6. The process as defined in claim 1 wherein the aqueous acidic solution contains nitric acid.

7. The process as defined in claim 1 wherein the aqueous acidic solution is contacted with the $TiO_2$ particles and maintained at a temperature of from about 225° to about 250° C. for about 30 to 120 minutes.

8. The process as defined in claim 1 wherein the $TiO_2$ particles prepared in step (a) are separated from the initial hydrolysis mixture prior to contacting them with the aqueous acidic retreatment solution.

9. The process as defined in claim 1 wherein the $TiO_2$ particles from step (a) are contacted with a sufficient amount of said aqueous acidic solution to make a slurry reaction mixture containing up to 50 percent by weight of $TiO_2$ particles.

10. The process as defined in claim 1 wherein the $TiO_2$ particles from step (a) are contacted with a sufficient amount of the aqueous acidic solution to make a slurry reaction mixture containing from 5 to 25 percent by weight of said $TiO_2$ particles.

11. The process as defined in claim 1 wherein said aqueous acidic solution contains up to the saturation level of a salt selected from the group consisting of ammonium salts, metal salts wherein the metal has a valence not greater than 2, and mixtures thereof.

12. The process as defined in claim 1 including an addition step of (a) preparing said colloidal suspension of titanium dioxide nucleating seed particles by heating an aqueous titanium chloride solution having a chloride/titanium ratio of from about 1.5 to about 4, a pH of about 0.3 to about 0.7 and a titanium concentration of from about 8 to about 30 grams per liter, and said suspension is admixed with said titanium chloride solution wherein said solution contains from about 30 to about 40 grams per liter of titanium, from about 7 to about 8 gram-ions per liter of chloride ions and less than 0.1 gram-ions per liter of multivalent anions;

(b) heating said admixture at a temperature of from about 115° to about 150° C. for about 30 to 120 minutes to precipitate titanium dioxide particles;

(c) contacting said titanium dioxide particles with a sufficient amount of said aqueous acidic solution to make a slurry reaction mixture containing up to about 50 percent by weight of said titanium dioxide and wherein said solution contains from 1 to 4 percent of an acid selected from the group consisting of HCl, HClO$_4$, HNO$_3$ and mixtures thereof, and less than 1 gram-ion per liter of cations having a valence greater than 2;

(d) heating said solution at a temperature of from about 225° C. to about 250° C. for about 30 to 120 minutes to produce pigmentary rutile TiO$_2$.

13. The process as defined in claim 12 wherein said aqueous acidic solution contains from 1 to about 4 gram-moles per liter of nitric acid.

14. A process for preparing pigmentary rutile titanium dioxide which comprises performing the following steps under autogenous pressure:

(a) heating an initial hydrolysis mixture of a colloidal suspension of titanium dioxide nucleating seed particles with a titanium chloride solution having a titanium concentration of from about 20 to 80 grams per liter, a chloride concentration of from about 6 to about 11 gram-ions per liter and less than 1 gram-ion per liter of multivalent anions at a temperature of from about 85 to about 150° C. for from about 15 minutes to about two hours to precipitate titanium dioxide particles;

(b) separating said TiO$_2$ from said reaction solution; and (c) contacting said titanium dioxide particles with an aqueous acidic solution in a sufficient amount to provide a slurry reaction mixture containing from about 5 to about 25 percent by weight of said titanium dioxide particles, said aqueous acidic solution further characterized as containing from about 0.01 to about 20 gram-moles per liter of HNO$_3$, about 0.01 to about 20 gram-moles per liter of HClO$_4$, 0.01 to about 5.5 gram-moles of HCl, or mixtures thereof, and containing less than 1 gram-ion per liter of multivalent anions and less than 1 gram-ion per liter of cations having a valence greater than 2 while heating said admixture to a temperature of from about 175° to 300° C. for at least 15 minutes to enhance the tinting strength of said TiO$_2$ and produce pigmentary rutile TiO$_2$ having a tinting strength of at least about 1500.

References Cited

UNITED STATES PATENTS

| | | | |
|---|---|---|---|
| 2,062,134 | 11/1936 | Kubelka et al. | 23—202 |
| 2,303,306 | 11/1942 | Tillmann et al. | 23—202 |
| 2,511,218 | 6/1950 | Olson et al. | 23—202 |
| 3,329,484 | 7/1967 | Long et al. | 23—202 |

EDWARD STERN, Primary Examiner